United States Patent
Vallette

(12) 
(10) Patent No.: US 8,385,911 B1
(45) Date of Patent: Feb. 26, 2013

(54) METHOD FOR GENERATING PROPAGATION CHARACTERISTICS OF A MULTIPATH ENVIRONMENT

(76) Inventor: Laurent Vallette, Velizy (FR)

( * ) Notice: Subject to any disclaimer, the term of this patent is extended or adjusted under 35 U.S.C. 154(b) by 4 days.

(21) Appl. No.: 13/205,363

(22) Filed: Aug. 8, 2011

(51) Int. Cl.
*H04W 24/00* (2009.01)
(52) U.S. Cl. ............... 455/425; 455/456.1; 455/456.6; 455/67.11; 455/423; 455/441
(58) Field of Classification Search ........ 455/456.1–457, 455/442, 422.1–425, 66.1–67.16
See application file for complete search history.

(56) References Cited

U.S. PATENT DOCUMENTS

| | | | | |
|---|---|---|---|---|
| 6,278,861 | B1 * | 8/2001 | Ward et al. .................... | 455/13.1 |
| 6,597,914 | B1 * | 7/2003 | Silventoinen et al. ..... | 455/456.1 |
| 7,379,744 | B2 * | 5/2008 | Tamaki et al. ............. | 455/456.5 |
| 7,418,260 | B2 * | 8/2008 | Lucidarme ................... | 455/423 |
| 7,764,231 | B1 * | 7/2010 | Karr et al. .................... | 342/457 |
| 8,032,153 | B2 * | 10/2011 | Dupray et al. ............. | 455/456.1 |

* cited by examiner

*Primary Examiner* — Sharad Rampuria
(74) *Attorney, Agent, or Firm* — Pearl Cohen Zedek Latzer, LLP

(57) ABSTRACT

A method, using a positioning module and a wireless telecommunication network comprises first and second base stations and first and second mobile terminals, said first terminal comprising a rake receiver, the method comprising:

storing received signal data (MT_data) generated by the first mobile terminal rake receiver from signals transmitted over the air in a multipath environment and received by first mobile terminal;

storing positioning data (MT_pos) obtained from the positioning module, said positioning data (MT_pos) comprising a plurality of positions of first mobile terminal with time associated with such position information;

storing base station data obtained from first base station, said base station data comprising first base station identification code (BS_id) and first base station position information (BS_pos);

determining field test data from said received signal data (MT_data), positioning data (MT_data) and base station data (BS_id, BS_pos), such determined field test data comprising:

an estimate of the angle (MT_BS_ang) between the first mobile terminal antenna orientation and the first base station antenna orientation, an estimate of the pathloss and the shadowing attenuation of the received signals (path_shad), at least one tap of the received signals (sig_taps), a tap being an information representing an estimate of phase and amplitude of a path of the multipath environment, and an estimate of the first mobile terminal speed (MT_speed)

generating radio propagation characteristics of the multipath environment for simulation of radio propagation between the second base station and the second mobile terminal, using the determined field test data.

11 Claims, 5 Drawing Sheets

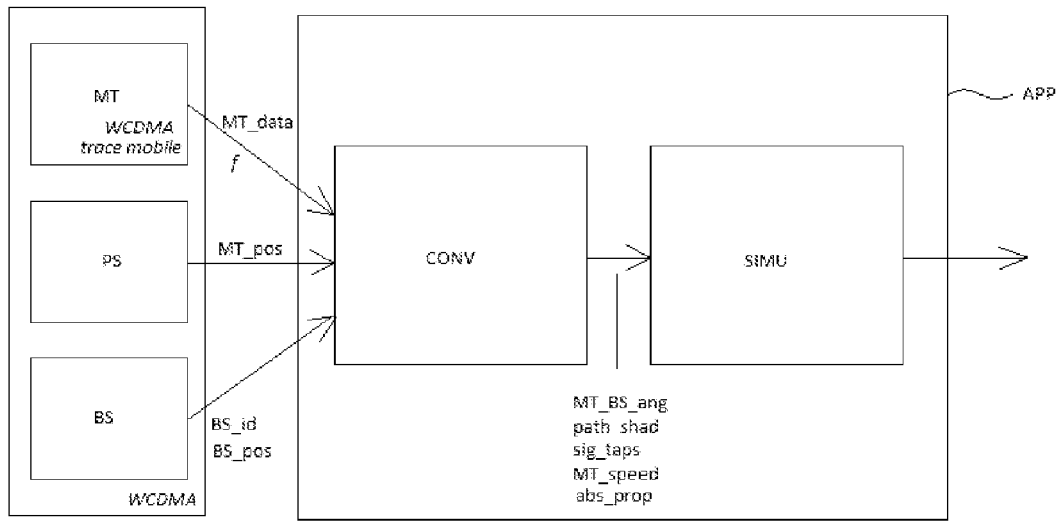
FIGURE 1
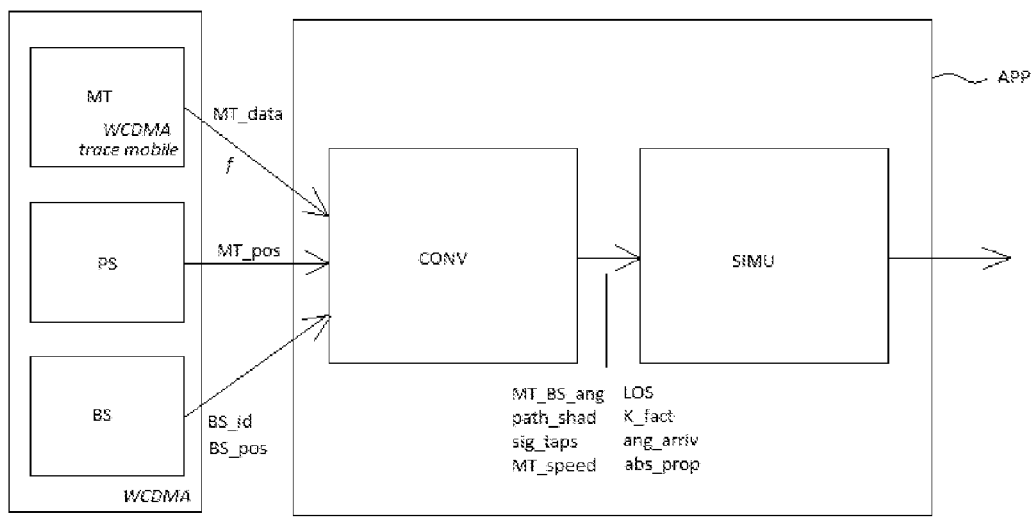
FIGURE 1BIS

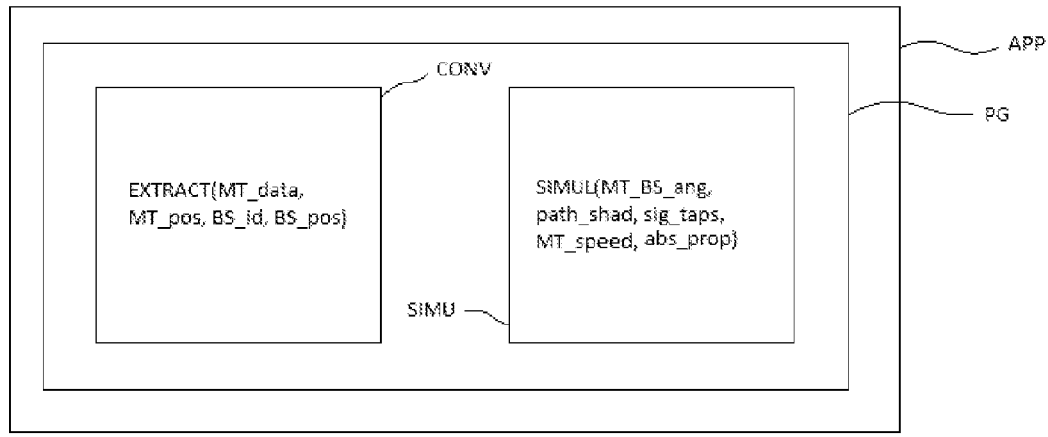
FIGURE 2
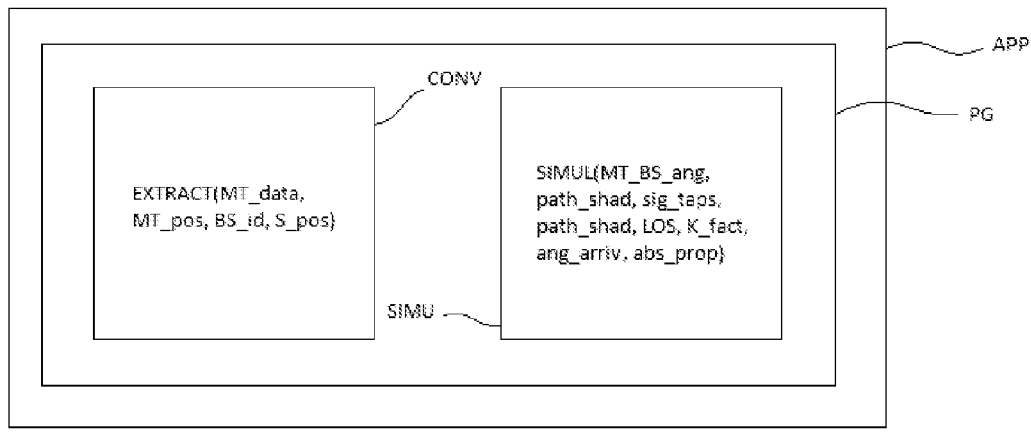
FIGURE 2BIS

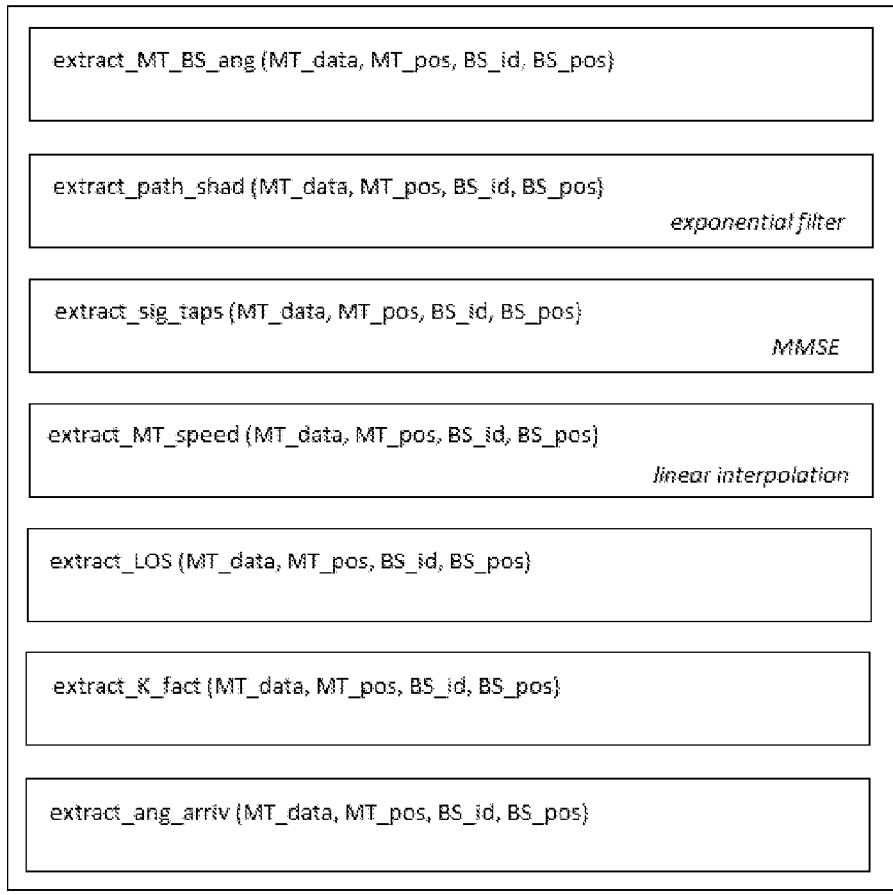
FIGURE 4Abis
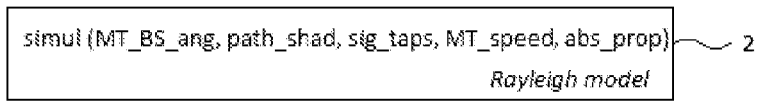
FIGURE 4B
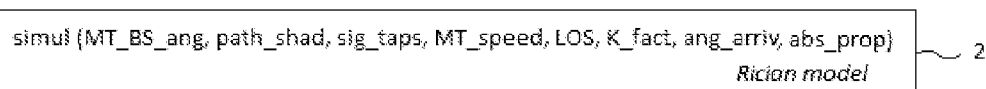
FIGURE 4Bbis

METHOD FOR GENERATING PROPAGATION CHARACTERISTICS OF A MULTIPATH ENVIRONMENT

FIELD OF THE INVENTION

The present invention relates to a method, using a positioning module and a wireless telecommunication network comprising at least a first base station and a first mobile terminal comprising a rake receiver, for generating propagation characteristics of signals transmitted between the first base station and first the mobile terminal.

BACKGROUND OF THE INVENTION

The complexity of a wireless telecommunication network, for example a wideband code division multiple access (WCDMA) network, or a long term evolution (LTE) network, makes it difficult to accurately analyze, test, and optimize network parameters and equipment.

A first solution is using computer simulations with manual configurations for the network parameters, but it has no realistic results. Moreover, it is very difficult to implement.

A second solution is performing field testing. Field testing is typically performed using a mobile diagnostic terminal to capture base-stations signals, as the mobile diagnostic terminal moves throughout the network region. To optimize and test system parameters of a wireless telecommunication network, numerous performance field tests are typically necessary. In other words, each time a system parameter is changed, a new field test must be performed by using the mobile diagnostic terminal to collect new field test data. Such repeated field testing is time-consuming and costly. Furthermore, the channel conditions in the network are constantly changing, and thus the reliability of repeated tests under changing field conditions is low.

SUMMARY OF THE INVENTION

It is an object of the invention to provide a method for generating propagation characteristics of a multipath environment, without repeated field testing, which resolve the problems above-mentioned.

To this end, there is provided a method, using a positioning module and a wireless telecommunication network comprising first and second base stations and first and second mobile terminals, said first terminal comprising a rake receiver, the method comprising:
- storing received signal data generated by the first mobile terminal rake receiver from signals transmitted over the air in a multipath environment and received by first mobile terminal;
- storing positioning data obtained from the positioning module, said positioning data comprising a plurality of positions of first mobile terminal with time associated with such position information;
- storing base station data obtained from first base station, said base station data comprising first base station identification code and first base station position information;
- determining field test data from said received signal data, positioning data and base station data, such determined field test data comprising:
  - an estimate of the angle between the first mobile terminal antenna orientation and the first base station antenna orientation,
  - an estimate of the pathloss and the shadowing attenuation of the received signals,
  - at least one tap of the received signals, a tap being an information representing an estimate of phase and amplitude of a path of the multipath environment, and
  - an estimate of the first mobile terminal speed
- generating radio propagation characteristics of the multipath environment for simulation of radio propagation between the second base station and the second mobile terminal, using the determined field test data.

As we will see in further details, said extracted field test data from previously collected data (the rake receiver data) will permit to generate network conditions without repeated field testing.

According to not limited embodiments, the method can comprise one or more of the following additional characteristics:
- The first mobile terminal is a Wideband Code Division Multiple Access (WCDMA) mobile. Indeed, these mobile terminals comprise a rake receiver which permits to acquire field test data.
- The first mobile terminal speed is deduced by linear interpolation of data generated from the first mobile terminal position over time. Indeed, the interpolation is easy to carry out.
- The step of extracting an estimate of the pathloss and the shadowing attenuation is made by means of filters whose time constant is inversely proportional to the first mobile terminal speed. Indeed:
  - the pathloss and the shadowing attenuation of the received signals is obtained by filtering the fast-fading from the rake receiver data
  - the fast-fading coherence time is inversely proportional to the field test mobile terminal speed.
- The wireless telecommunication network is a WCDMA network.
  Indeed, one can use a WCDMA mobile comprising a rake receiver.
- The step of generating radio propagation characteristics uses a Rayleigh model. Indeed, this model fits when there is no line of sight tap.
- The determined field test data further includes a line of sight tap. It permits to reproduce more accurate signals propagation characteristics.
- The determined field test data further includes a K-factor ricean parameter. It permits to reproduce more accurate signals propagation characteristics.
- The determined field test data further includes the angles of arrival, said angles of arrival being the angles between the first mobile terminal route direction and the direction of signals arriving on the first mobile terminal. It permits to reproduce more accurate signals propagation characteristics.
- The step of reproducing signals propagation characteristics uses a Rician model. Indeed, this model fits to the existence of a line of sight tap.

In addition, there is provided an apparatus (APP), using a positioning module (PS) and a wireless telecommunication network comprising first and second base stations (BS) and first and second mobile terminals (MT), said first terminal (MT) comprising a rake receiver, said apparatus (APP) comprising:
- a converter (CONV) adapted to determine field test data from:
  - received signal data (MT_data) generated by the first mobile terminal rake receiver from signals transmitted over the air in a multipath environment and received by first mobile terminal;

positioning data (MT_pos) obtained from the positioning module, said positioning data (MT_pos) comprising a plurality of positions of first mobile terminal with time associated with such position information;

base station data obtained from first base station, said base station data comprising first base station identification code (BS_id) and first base station position information (BS_pos), such determined field test data comprising:

an estimate of the angle (MT_BS_ang) between the first mobile terminal (MT) antenna orientation and the first base station (BS) antenna orientation, an estimate of the pathloss and the shadowing attenuation of the received signals (path_shad), at least one of the received signals (sig_taps), a tap being an information representing an estimate of phase and amplitude of a path of the multipath environment, and an estimate of the first mobile terminal speed (MT_speed)

a multipath simulator (SIMU) adapted to generate radio propagation characteristics of the multipath environment for simulation of radio propagation between the second base station and the second mobile terminal, using the determined field test data.

In addition, there is provided a computer program product for a computer, comprising a set of instructions, which when loaded into said computer, causes the computer to carry out the method according to any one of the previous characteristics.

BRIEF DESCRIPTION OF THE DRAWINGS

Some embodiments of apparatus and/or methods in accordance with embodiments of the present invention are now described, by way of example only, and with reference to the accompanying drawings, in which:

FIG. 1 is a first block diagram of a data exchange between equipments of a network and an apparatus for generating propagation characteristics which permits to carry out the method in accordance with the present invention;

FIG. 1bis is a second block diagram of a data exchange between equipments of a network and an apparatus for generating propagation characteristics which permits to carry out the method in accordance with the present invention;

FIG. 2 schematically illustrates a first not limited embodiment of the apparatus used within data exchange of FIG. 1;

FIG. 2bis schematically illustrates a second not limited embodiment of the apparatus used within data exchange of FIG. 1bis;

FIG. 4Abis is a functional diagram of a second not limited embodiment of an extracting step of the method for generating propagation characteristics of FIG. 3;

FIG. 4B is a functional diagram of a first not limited embodiment of a simulation step of the method for generating propagation characteristics of FIG. 3;

FIG. 4Bbis is a functional diagram of a second not limited embodiment of a simulation step of the method for generating propagation characteristics of FIG. 3.

DETAILED DESCRIPTION OF THE INVENTION

Figure 3:
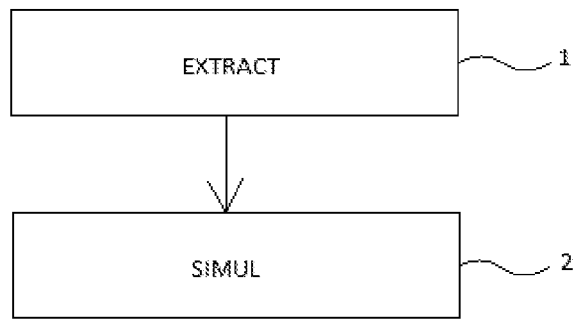
FIG. 3 is a flowchart of a not limited embodiment of a method for generating propagation characteristics in accordance with the present invention.

In the following description, well-known functions or constructions by the man skilled in the art are not described in detail since they would obscure the invention in unnecessary detail.

The present invention relates to a method for generating propagation characteristics of a multipath environment.

Said method is carried out by an apparatus APP for generating propagation characteristics of a multipath environment, using a first base station BS of a wireless telecommunication network and a first mobile terminal MT, which is illustrated in a not limited embodiment in FIGS. 1 to 2bis.

The first base station BS is equally named test base station, and the first mobile terminal MT is equally named field test mobile terminal.

FIG. 1 is a first block diagram of a data exchange between equipments of a network and said apparatus APP. In a not limited embodiment, said apparatus APP comprises a converter CONV and a multipath simulator SIMU. The apparatus APP receives data from the field test mobile terminal MT and the test base station BS of a wireless communication network (which is in a not limited example a WCDMA network), and from a positioning module PS, such as in a not limited example a Global Positioning System GPS. The positioning module is equally next to the field test mobile terminal MT, or a module of the field test mobile terminal MT. The data reception is described hereinafter.

The field test mobile terminal MT receives signal from the test base station BS, which is one of the surrounding base stations of the field test mobile terminal MT. Indeed, as a WCDMA mobile terminal, the field test mobile terminal MT is able to use neighborhood information broadcast by the test wireless communication network, to receive signals only from surrounding base stations.

Due to reflections, diffractions or scattering from obstacles (on the ground and surrounding structures), the received signal comprises many copies of an originally transmitted signal having different amplitudes, phases and delays. Thus, the field test mobile terminal MT sees the superposition of multiple copies of the transmitted signal, each traversing a different path. Each path is called a tap. As a WCDMA mobile terminal, the field test mobile terminal MT comprises a rake receiver. A rake receiver is a radio receiver designed to counter the effects of multipath using several "sub-receivers" called fingers. Fingers are several correlators assigned to a different multipath component. Each finger independently decodes a single multipath component. The rake receiver data MT_data of the field test mobile terminal MT, comprising the different multipath components, is sent to the converter CONV. Rake receiver data is, among others, available in the trace of a WCDMA terminal mobile. Therefore, in a not limited embodiment, the field test terminal mobile MT is a trace mobile. A trace mobile is a mobile providing capacity to save real logs of radio measurements, input and output data of its internal function blocks, and software execution steps.

The positioning module PS localizes the field test mobile terminal MT over time, and sends positioning data MT_pos, to the converter CONV. Positioning data MT_pos comprises a plurality of positions of the field test mobile terminal MT with time.

The converter CONV also receives data from the test base station BS: the test base station identification code BS_id, and the test base station geographical position information BS_pos. Every base stations transmit signals on a single frequency, using an identification code that allows a receiver to identify the base station emitter of a signal.

In this embodiment, no line of sight tap is detected by the converter CONV, a line of sight tap being a direct tap which comes from a base station to a mobile terminal without any reflection, diffraction or scattering from obstacles. It means that an imaginary observer standing on the test base station BS couldn't see the field test mobile terminal MT.

After some operations (described below), the converter CONV creates parameters: the angle MT_BS_ang between the field test mobile terminal MT antenna orientation and the test base station BS antenna orientation, the pathloss and the shadowing attenuation path_shad of the received signals, the taps sig_taps, and the field test mobile terminal speed MT_speed.

It is to be noted that the pathloss is attenuation of an electromagnetic wave as it propagates through space. The shadowing is the attenuation due to obstacles affecting the wave propagation.

These parameters MT_BS_ang, path_shad, sig_taps, and MT_speed are sent to the multipath simulator SIMU, which generates propagation characteristics of the multipath environment, between a mobile terminal and a base station.

FIG. 1 bis is a second block diagram of a data exchange between equipments of a network and said apparatus APP. Elements are the same as in FIG. 1: a converter CONV, a multipath simulator SIMU, a field test mobile terminal MT, a positioning module PS and a test base station BS.

The field test mobile terminal MT sends the rake receiver data MT_data to the converter CONV, the positioning module PS sends the positioning data MT_pos to the converter CONV, and the test base station BS sends the test base station identification code BS_id and the test base station position information BS_pos to the converter CONV as previously described.

In this embodiment, a line of sight tap LOS is detected by the converter CONV. A line of sight tap is the earliest tap received from a base station BS.

After some operations (described below), the converter CONV creates parameters: the angle MT_BS_ang between the field test mobile terminal MT antenna orientation and the test base station BS antenna orientation, the pathloss and the shadowing attenuation path_shad of the received signals, the taps sig_taps, the field test mobile terminal speed MT_speed, the line of sight tap LOS, the ricean K-factor K_fact, and the angles of arrival ang_arriv.

Figure 5:
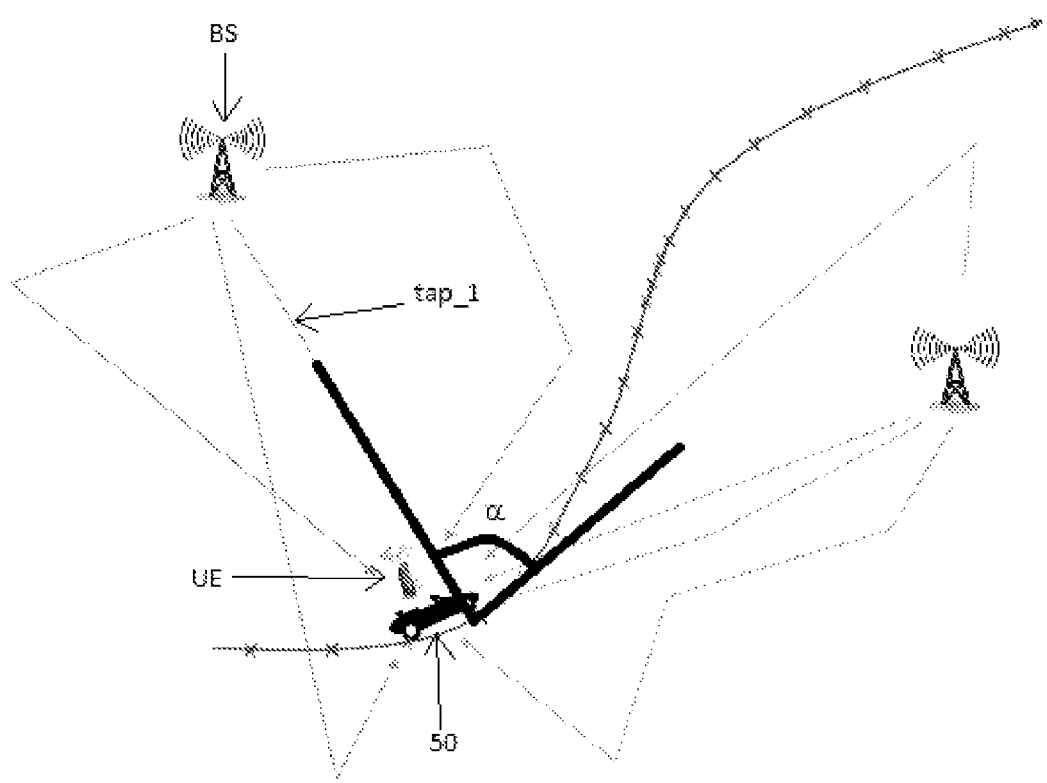
FIG. 5 schematically illustrates a not limited example of signals propagation in a WCDMA environment with angle of arrival used in the extracting step of the method for generating propagation characteristics of FIG. 3.

It is to be noted that in multipath environments, the ricean K-factor describes the power ratio between the direct path component and scattered multipath components of the signals received from a base station. The angles of arrival $\alpha$ are the angles between the field test mobile terminal MT route direction and the directions of signals arriving on the field test mobile terminal MT, as illustrated in FIG. 5. FIG. 5 schematically illustrates a not limited example of signals propagation in a WCDMA environment with an angle of arrival $\alpha$ of a tap tap_1 used in the extracting step of the method for generating propagation characteristics of FIG. 3. The test base station BS transmits signals to the field test mobile terminal MT stuck to a car 50. Signals follow different paths because of the multipath environment, and therefore are composed of a direct path component and scattered multipath components.

The parameters MT_BS_ang, path_shad, sig_taps, MT_speed, LOS, K_fact, and ang_arriv are sent to the multipath simulator SIMU, which generates propagation characteristics in the multipath environment, between the field test mobile terminal MT and the test base station BS.

FIG. 2 schematically illustrates a first not limited embodiment of the apparatus APP for the embodiment of FIG. 1. The converter CONV executes a function, named EXTRACT. The multipath simulator SIMU executes a function named SIMUL.

FIG. 2bis schematically illustrates a second not limited embodiment of the apparatus APP for the embodiment of FIG. 1bis. The converter CONV executes a function, named EXTRACT. The multipath simulator SIMU executes a function named SIMUL.

FIG. 3 is a flowchart of the method for generating propagation characteristics of the multipath environment.

The function EXTRACT is followed by the function SIMUL.

The method comprises:
  determining field test data from received signal data (MT_data), positioning data (MT_data) and base station data (BS_id, BS_pos), such determined field test data comprising:
    an estimate of the angle (MT_BS_ang) between the first mobile terminal (MT) antenna orientation and the first base station (BS) antenna orientation,
    an estimate of the pathloss and the shadowing attenuation of the received signals (path_shad),
    at least one tap of the received signals (sig_taps), a tap being an information representing an estimate of phase and amplitude of a path of the multipath environment, and
    an estimate of the first mobile terminal speed (MT_speed)
  generating radio propagation characteristics of the multipath environment for simulation of radio propagation between the second base station and the second mobile terminal, using the determined field test data.

The method is described in details below.

Figure 4A:
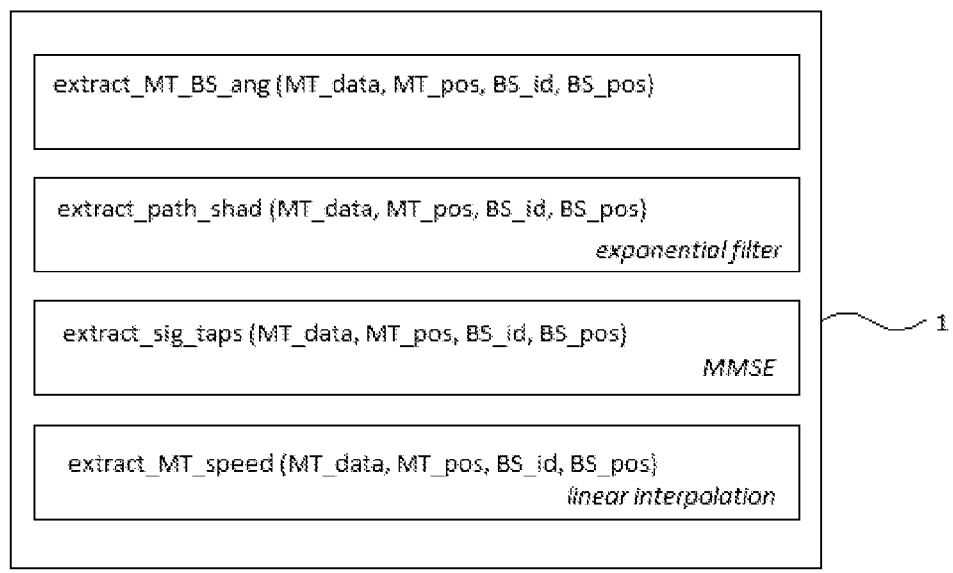
FIG. 4A is a functional diagram of a first not limited embodiment of an extracting step of the method for generating propagation characteristics of FIG. 3.

Reference to FIGS. 4A to 4C bis will be made.

In a first step 1), one extracts field test data from the rake receiver data MT_data.

FIG. 4A is a functional diagram of the function EXTRACT for the embodiment of FIG. 1 (when no line of sight tap is detected). The function EXTRACT is divided in 4 sub-functions, named extract_MT_BS_ang, extract_path_shad, extract_sig_taps, and extract_MT_speed. These functions have the rake receiver data MT_data, the positioning data MT_pos, the test base station identification code BS_id and the test base station position information BS_pos as input parameters.

The sub-function extract_MT_BS_ang aims at extracting the angle MT_BS_ang between the field test mobile terminal MT antenna orientation and the test base station BS antenna orientation. The sub-function extract_MT_BS_ang first extracts the field test mobile terminal MT antenna orientation, secondly extracts the test base station BS antenna orientation, and thirdly calculates the angle MT_BS_ang.

The field test mobile terminal MT antenna orientation is obtained through the positioning module PS, in Frenet coordinates reference system, and the test base station BS antenna orientation is fixed and known in earth coordinates reference system. Getting the angle MT_BS_ang between the field test mobile terminal MT antenna orientation and the test base station BS antenna orientation is trigonometric computation.

The sub-function extract_MT_speed aims at reconstructing the temporal continuity of the field test mobile terminal MT_speed. The speed is frequently given by the positioning module PS. The positions for intermediate times are reconstructed by means of linear interpolation.

The sub-function extract_path_shad aims at extracting the pathloss and the shadowing attenuation path_shad of the received signals. The pathloss and the shadowing attenuation are obtained by filtering the fast-fading component from RSCP, which is part of rake receiver data MT_data, as explained below.

Indeed, the rake receiver provides instantaneous taps detection, and works at a frequency f. At each time of detection, the rake receiver outputs a sample which comprises two data for each detected tap: the RSCP and the TIMING. RSCP stands for Received Signal Code Power. It represents the measure of CPICH power at the field test mobile terminal MT. CPICH stands for Common Pilot Channel, and is used for grading signals power. Cf 3GPP 25101 page 8, and 25133 §9.1.1. The TIMING is explained in the explanation of the sub-function extract_taps.

In a not limited embodiment of the method, for each detected tap, the RSCP is filtered using exponential filter whose time constant is inversely proportional to the field test mobile terminal speed MT_speed. Indeed:
the pathloss and the shadowing attenuation of the received signals is obtained by filtering the fast-fading from the rake receiver data
the fast-fading coherence time is inversely proportional to the field test mobile terminal speed.

Below is a non limited example of an algorithm used to filter the RSCP:

$$C=3e8$$

$$C1=9*C^2$$

$$C2=16*\pi*FT^2$$

$$TC=\sqrt{(C1/(C2*(MT\_speed*0.27777)^2))}$$

if $TC>K4$, then $RT=TC*K3$, else $RT=K5$ $$K1=Re(\exp(\log(K6)/(RT/T)))$$

$$K2=1-K1$$

$$RSCP\_filtered(N)=K1*RSCP(N)+K2*RSCP\_filtered(N-1)$$

Where:
C is the light propagation speed in m/s
FT is the WCDMA downlink transmission frequency of a cell, in Hertz
MT_speed is the field test mobile terminal speed in km/h
TC is the channel time coherence, function of MT_speed
K3, K4, K5, K6 are constants
T is the rake receiver sampling rate in seconds
RT is the filter unitary echelon response raise time, in seconds
N is a detection number The sub-function extract_taps aims at reconstructing the taps sig_taps. As previously explained, the rake receiver provides instantaneous taps detection, and works at a frequency f. At each time of detection, the rake receiver outputs a sample which comprises two data for each detected tap: the RSCP and the TIMING. The RSCP has been explained above. The TIMING corresponds to a time of detection in the local field test mobile terminal MT clock reference. Therefore, TIMING offsets between detected taps correspond to relative propagation delays of taps detected, and are not absolute values.

Taps may temporarily or definitively disappear from one time to another, and others can appear. Their propagation delay and their RSCP evolve in time, so it is necessary to rebuild the continuity in time of detected taps.

Each tap in reconstruction is followed by an entity named tracker. A tracker of a tap can provide, at each new detection, data about previous detections:
the last update time, which is the last time a new point has been added to the tap, in universal time, named CLOCK
the filtered value of TIMING(N−1), named TIMING_filtered(N−1)
the filtered value of RSCP(N−1): RSCP_filtered(N−1) with an exponential filter of type:

$$\text{Value filtered}(N)=\text{Value filtered}(N-1)*K+\text{Value}(N)*(1-K), \text{where } K \text{ is a constant.}$$

When a new sample arrives, it is necessary to correlate the points of the new sample to the existing trackers, with the best correlations possible, to reconstruct taps. Some points of the new sample may not be associated to any preexisting taps, and then new trackers would be created to follow new taps. Trackers not updated for a long time are destroyed.

In a not limited embodiment of the method, the correlation is made by means of a Minimum Mean Square Error (MMSE) algorithm. Below is an example of a computation. This computation has for input parameters a tracker and a point of a new detected sample, so for each new sample, computation has to be done K times, where K=number of trackers×number of points of a new detected sample:

Let $D\_CLOCK=CLOCK$ of detection−CLOCK of tracker last update

Let $D\_TIMING=$detection TIMING−tracker filtered TIMING

Let $D\_RSCP=$detection RSCP−tracker filtered RSCP

Let $M1$, $M2$ and $M3$ be constants.

$$MMSE(\text{point},\text{tracker})=(M1*D\_TIMING^2+M2*D\_CLOCK^2+M3*D\_RSCP^2)$$

After every computation is done, correlations between points and trackers are performed starting with the couple with minimal MMSE value, and then in an increasing MMSE order. New trackers are created for non correlated remaining points. Finally, for each correlated tracker, last update time is turned into current time. Moreover, trackers not updated after a timeout are destroyed. The timeout is inversely proportional to MT_speed, in the order of hundred of milliseconds to several seconds.

FIG. 4Abis is a functional diagram of the function EXTRACT for the embodiment of FIG. 1 bis (when a line of sight tap LOS is detected). The function EXTRACT is divided in 7 sub-functions, named extract_MT_BS_ang, extract_path_shad, extract_sig_taps, extract_MT_speed, extract_LOS, extract_K_fact and extract_ang_arriv. These functions have:
the rake receiver data MT_data,
the positioning data MT_pos,
the test base station identification code BS_id, and
the test base station position information BS_pos,
as input parameters.

The sub-functions extract_MT_BS_ang, extract_path_shad, extract_sig_taps, and extract_MT_speed have already been explained in FIG. 4A.

The sub-function extract_LOS aims at determining the line of sight tap LOS. As previously explained a line of sight tap is a direct tap which comes from a base station to a mobile terminal without any reflection, diffraction or scattering from obstacles. As a consequence the line of sight tap is the tap which has the shortest propagation time.

In a not limited embodiment of the method, the sub-function extract_LOS uses the following described algorithm. This algorithm defines a reference tap, which is the detected tap having the shortest propagation time. The reference tap may be the line of sight tap LOS, or may be not if the line of sight tap LOS, as explained below.

At each iteration of the algorithm, for example at the iteration corresponding to time T, the algorithm considers the reference tap determined at time T−1. The line of sight tap LOS can be masked at time T−1 and then appear at time T. In this case the reference tap is not the line of sight tap LOS.

For each tap, let TP=propagation time of the tap−propagation time of the reference tap. At time T, if TP<0, then the tap becomes the reference tap, which is the potential line of sight tap LOS.

Statistically, a line of sight tap travels with two or three taps whose propagation times are very close to the one of the line of sight tap. In addition, the line of sight tap is powerful, so it is detectable during two or three detection times. As a consequence:
 if the reference tap is the line of sight LOS, there are two or three taps that have TP≈0
 if the reference tap is not the line of sight tap LOS, then there is a high probability to have several taps that have TP<0. This observation is based on experimental results.

At time T, the algorithm computes TP for each detected tap. Then taps are classified into 4 categories:
 taps very early relative to the reference tap (TP<<0)
 taps early relative to the reference tap (TP<0)
 taps is the range of the reference tap (TP≈0)
 taps late relative to the reference tap (TP>0)
 Taps in each category are counted.

If the number of taps in the categories "very early" and "early" is bigger than the number of taps in the category "in the range", then the reference tap is not the line of sight tap LOS. In this case, taps in the categories "very early" and "early" are possibly the two or three taps traveling with the line of sight tap LOS. To confirm this possibility, the same calculations are made for T+1 and T+2 times, since the line of sight is detectable during two or three detection times Counting taps is a way to avoid taking in account a wrong detection. It was observed statistically that LOS is associated with close range taps. Standalone candidate LOS detection are then ignored because have high probability to be real detection.

The sub-function extract_K_fact aims at estimating a rician K-factor K_fact. Rician K-factor is a linear function of signal attenuation variance. The sub-function extract_K_fact calculates the signal variance and uses a table of K-factors depending on variances to determine the associated K-factor K_fact. The table of K-factors depending on variances is experimentally determined, in measuring variances depending on K-factors, since the function is linear. Experiments are driven using a multipath generator in a WCDMA lab network, with a configuration of one tap and a Ricean model, well known by the man skilled in the art.

The sub-function extract_ang_arriv aims at determining the angles of arrival ang_arriv. The angles of arrival are computed with simple trigonometric computation, well known by the man skilled in the art, using the field test mobile terminal MT moving direction, and the test base station BS direction.

In a third step 3), one generates propagation characteristics of the wireless telecommunication network, from the extracted field test data.

FIG. 4B is a functional diagram of the function SIMUL for the embodiment of FIG. 1 (when no line of sight tap is detected). In this case, in a not limited embodiment, the multipath simulator SIMU uses a Rayleigh model, well known by the man skilled in the art, or in an other embodiment, a Rician model configured as a Rayleigh model. The Rayleigh model has the angle MT_BS_ang between the field test mobile terminal MT antenna orientation and the test base station BS antenna orientation, the pathloss and the shadowing attenuation path_shad of the received signals, the taps sig_taps, and the field test mobile terminal speed MT_speed, as input parameters. Thus, the multipath simulator SIMU generates propagation characteristics of the wireless telecommunication network.

FIG. 4Bbis is a functional diagram of the function SIMUL for the embodiment of FIG. 1 bis (when a line of sight tap LOS is detected). The multipath simulator SIMU uses a Rician model. The Rician model has the angle MT_BS_ang between the field test mobile terminal MT antenna orientation and the test base station BS antenna orientation, the pathloss and the shadowing attenuation path_shad of the received signals, the taps sig_taps, the field test mobile terminal speed MT_speed, the line of sight tap LOS, the ricean K-factor K_fact, and the angles of arrival ang_arriv, as input parameters. Thus, the multipath simulator SIMU generates propagation characteristics of the wireless telecommunication network.

An additional input parameter needed by the multipath simulator SIMU when no line of sight is detected, and when a line of sight LOS is detected, is the absolute propagation delays of taps abs_prop. The absolute propagation delay of the reference tap is computed using light speed, which is considered as being the speed of a signal, and the distance between the test base station BS and the field test mobile terminal MT. The absolute propagation delays of every other taps are computed using the sum of the reference tap propagation delay and the relative propagation delay extracted from step 1.

With the method described in the present invention, in connecting a second base station and a second mobile terminal to the multipath simulator SIMU, not only the pathloss and the shadowing of the original signals are reconstructed, but also characteristics as the angles of arrival, the orientations of the mobile terminal, the orientation of the base station, etc. Therefore the whole multipath environment can be reconstructed (multipaths and propagation delays).

This invention permits to test effects of changes in a network (for example a change of base station software such as new functionalities of a base station), and to compare terminal mobiles, without need of repeated field testing. As a consequence, the invention makes possible fine tuning of the network parameters, to develop optimization strategy. Another interest of the invention is to have a tool able to predict the effect of multipath environment to maximum throughput achievable.

A person of skill in the art would readily recognize that steps of above-described methods can be performed by programmed computers. Herein, some embodiments are also intended to cover program products for a computer, comprising a set of instructions, which, when loaded into said computer, causes the computer to carry out above-described method. The program storage devices may be, e.g., digital memories, magnetic storage media such as a magnetic disks and magnetic taps, hard drives, or optically readable digital data storage media. The embodiments are also intended to cover computers programmed to perform said steps of the above-described method. In a not limited embodiment of FIG. 2 or FIG. 2bis, the apparatus APP comprises a computer program product PG, said computer program product comprising a set of instructions. Thus, said set of instructions contained, for example, in the apparatus programming memory, may cause the apparatus to carry out the different steps of the method for generating propagation characteristics.

The set of instructions may be loaded into the programming memory by reading a data carrier such as, for example, a disk. A service provider can also make the set of instructions available via a communication network such as, for example, the Internet.

Of course, in another not limited embodiment, the apparatus APP may comprise a plurality of computer program products PG, for example, one in the converter CONV, and one in the simulator SIMU.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method, using a positioning module (PS) and a wireless telecommunication network comprising first and second base stations (BS) and first and second mobile terminals (MT), said first terminal comprising a rake receiver, the method comprising:
   storing received signal data (MT_data) generated by the first mobile terminal rake receiver from signals transmitted over the air in a multipath environment and received by first mobile terminal (MT);
   storing positioning data (MT_pos) obtained from the positioning module (PS), said positioning data (MT_pos) comprising a plurality of positions of first mobile terminal (MT) with time associated with such position information;
   storing base station data obtained from first base station (BS), said base station data comprising first base station identification code (BS_id) and first base station position information (BS_pos);
   determining field test data from said received signal data (MT_data), positioning data (MT_data) and base station data (BS_id, BS_pos), such determined field test data comprising:
      an estimate of the angle (MT_BS_ang) between the first mobile terminal (MT) antenna orientation and the first base station (BS) antenna orientation,
      an estimate of the pathloss and the shadowing attenuation of the received signals (path_shad),
      at least one tap of the received signals (sig_taps), a tap being an information representing an estimate of phase and amplitude of a path of the multipath environment, and
      an estimate of the first mobile terminal speed (MT_speed); and
   generating radio propagation characteristics of the multipath environment for simulation of radio propagation between the second base station and the second mobile terminal, using the determined field test data.

2. The method according to claim 1, wherein the first mobile terminal is a Wideband Code Division Multiple Access mobile.

3. The method according to claim 1, wherein the estimate of the first mobile terminal speed (MT_speed) is determined using linear interpolation of data representing positioning data (MT_pos).

4. The method according to claim 1, wherein the wireless telecommunication network is a WCDMA network.

5. The method according to claim 1, wherein the generating of radio propagation characteristics uses a Rayleigh model.

6. The method according to claim 1, wherein the determined field test data further includes a line of sight tap (LOS).

7. The method according to claim 6, wherein the determined field test data further includes a K-factor ricean parameter (K_fact).

8. The method according to claim 6, wherein the determined field data includes an estimate of the respective angles between the first mobile terminal (MT) route direction and the orientation of signals received at the first mobile terminal (MT).

9. The method according to claim 6, wherein the generating of radio propagation characteristics uses a Rician model.

10. An apparatus (APP), using a positioning module (PS) and a wireless telecommunication network comprising first and second base stations (BS) and first and second mobile terminals (MT), said first terminal (MT) comprising a rake receiver, said apparatus (APP) comprising:
    a converter (CONV) adapted to determine field test data from:
       received signal data (MT_data) generated by the first mobile terminal rake receiver from signals transmitted over the air in a multipath environment and received by first mobile terminal;
       positioning data (MT_pos) obtained from the positioning module, said positioning data (MT_pos) comprising a plurality of positions of first mobile terminal with time associated with such position information;
       base station data obtained from first base station, said base station data comprising first base station identification code (BS_id) and first base station position information (BS_pos),
    such determined field test data comprising:
       an estimate of the angle (MT_BS_ang) between the first mobile terminal (MT) antenna orientation and the first base station (BS) antenna orientation,
       an estimate of the pathloss and the shadowing attenuation of the received signals (path_shad),
       at least one of the received signals (sig_taps), a tap being an information representing an estimate of phase and amplitude of a path of the multipath environment, and
       an estimate of the first mobile terminal speed (MT_speed); and
    a multipath simulator (SIMU) adapted to generate radio propagation characteristics of the multipath environment for simulation of radio propagation between the second base station and the second mobile terminal, using the determined field test data.

11. A computer program product (PG) for a computer, comprising a set of instructions, which when loaded into said computer, causes the computer to carry out the method according to claim 1.

* * * * *